(12) United States Patent
Okamoto et al.

(10) Patent No.: US 12,327,212 B2
(45) Date of Patent: Jun. 10, 2025

(54) METHOD, INFORMATION PROCESSING APPARATUS, AND VEHICLE

(71) Applicant: TOYOTA JIDOSHA KABUSHIKI KAISHA, Toyota (JP)

(72) Inventors: Tetsushi Okamoto, Nisshin (JP); Kazumi Aono, Gamagori (JP); Naoki Uenoyama, Nagoya (JP); Jaya Bharath R. Goluguri, McKinney, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/518,872

(22) Filed: Nov. 4, 2021

(65) Prior Publication Data

US 2022/0147917 A1 May 12, 2022

(30) Foreign Application Priority Data

Nov. 6, 2020 (JP) .................. 2020-185970

(51) Int. Cl.
*G06Q 10/0832* (2023.01)
*G05D 1/00* (2024.01)
*G06Q 10/0833* (2023.01)
*G08B 7/06* (2006.01)

(52) U.S. Cl.
CPC ....... *G06Q 10/0832* (2013.01); *G05D 1/0223* (2013.01); *G06Q 10/0833* (2013.01); *G08B 7/06* (2013.01)

(58) Field of Classification Search
CPC ............. G06Q 10/083; G06Q 10/0833; G06Q 10/0832
See application file for complete search history.

(56) References Cited

U.S. PATENT DOCUMENTS

2014/0317005 A1* 10/2014 Balwani ............. G06Q 10/0832
705/317
2018/0321679 A1* 11/2018 Nixon .................... G08G 1/202
2019/0193721 A1 6/2019 Yamamuro
(Continued)

FOREIGN PATENT DOCUMENTS

CN 107851234 A 3/2018
JP H10160491 A 6/1998
(Continued)

OTHER PUBLICATIONS

Downes, "Minimizing the Risk of High Tech Shipment Damage and Loss," Purolator International Blog, Aug. 7, 2019, Retrieved from https://www.purolatorinternational.com/minimizing-risk-high-tech-shipment-damage-loss/ (Year: 2019).*

Primary Examiner — Shannon S Campbell
Assistant Examiner — Bryan J Kirk
(74) Attorney, Agent, or Firm — Dinsmore & Shohl LLP

(57) ABSTRACT

A method executed by an information processing apparatus configured to communicate with a vehicle that transports one or more packages stored in a storage space includes acquiring a transportation condition for a package to be stored in the storage space and controlling an environment of the storage space during transportation of the package, or limiting acceleration magnitude of the vehicle during transportation of the package, based on the acquired transportation condition.

17 Claims, 4 Drawing Sheets

(56) References Cited

U.S. PATENT DOCUMENTS

| | | | |
|---|---|---|---|
| 2019/0210806 A1 | 7/2019 | Aida | |
| 2020/0090117 A1* | 3/2020 | Luo | G06Q 10/083 |
| 2020/0090120 A1* | 3/2020 | Nakashima | G01C 21/3423 |
| 2021/0012600 A1* | 1/2021 | Imai | G06Q 10/0833 |
| 2021/0282419 A1* | 9/2021 | Chopko | A23B 7/148 |
| 2021/0312381 A1* | 10/2021 | Iyer | G16Y 20/10 |
| 2021/0319394 A1* | 10/2021 | Tazume | B65G 61/00 |
| 2023/0101825 A1* | 3/2023 | Adams | B60W 30/146 |
| | | | 701/93 |

FOREIGN PATENT DOCUMENTS

| | | |
|---|---|---|
| JP | 2002115962 A | 4/2002 |
| JP | 2002-265062 A | 9/2002 |
| JP | 2005-096963 A | 4/2005 |
| JP | 2005-172394 A | 6/2005 |
| JP | 2006-131374 A | 5/2006 |
| JP | 2011-184150 A | 9/2011 |
| JP | 2018036015 A | 3/2018 |
| JP | 2019-116251 A | 7/2019 |
| WO | 2017/017504 A1 | 2/2017 |
| WO | 2018/030025 A1 | 2/2018 |
| WO | 2018118010 A1 | 6/2018 |

* cited by examiner

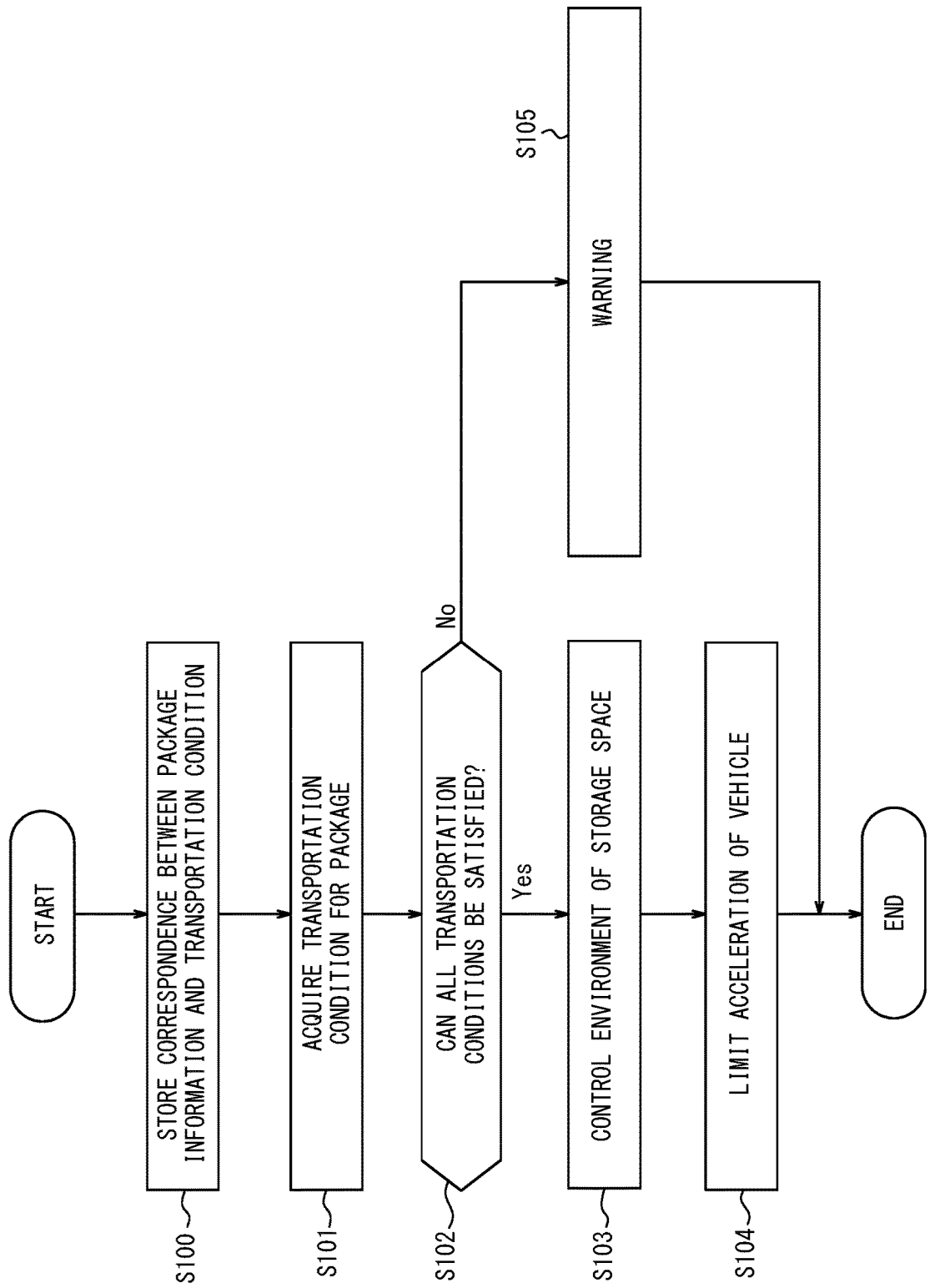

METHOD, INFORMATION PROCESSING APPARATUS, AND VEHICLE

CROSS-REFERENCE TO RELATED APPLICATION

This application claims priority to Japanese Patent Application No. 2020-185970, filed on Nov. 6, 2020, the entire contents of which are incorporated herein by reference.

TECHNICAL FIELD

The present disclosure relates to a method, an information processing apparatus, and a vehicle.

BACKGROUND

Technology for transporting packages using a vehicle is known. For example, patent literature (PTL) 1 discloses a method of determining the position for loading a package onto a cargo bed of a delivery vehicle, based on package information read from a product tag attached to the package, and instructing a delivery person by displaying the position.

CITATION LIST

Patent Literature

PTL 1: JP H10-160491 A

SUMMARY

Improvement in technology for transporting packages using a vehicle is desired.

It would be helpful to improve technology for transporting packages using a vehicle.

A method according to an embodiment of the present disclosure is a method to be executed by an information processing apparatus configured to communicate with a vehicle that transports one or more packages stored in a storage space, the method including:

acquiring a transportation condition for a package to be stored in the storage space; and controlling an environment of the storage space during transportation of the package, or limiting acceleration magnitude of the vehicle during transportation of the package, based on the acquired transportation condition.

An information processing apparatus according to an embodiment of the present disclosure is an information processing apparatus configured to communicate with a vehicle that transports one or more packages stored in a storage space, the information processing apparatus including a controller configured to:

acquire a transportation condition for a package to be stored in the storage space; and control an environment of the storage space during transportation of the package, or limit acceleration magnitude of the vehicle during transportation of the package, based on the acquired transportation condition.

A vehicle according to an embodiment of the present disclosure is a vehicle including a storage space and a controller configured to:

acquire a transportation condition for a package to be stored in the storage space; and control an environment of the storage space during transportation of the package, or limit acceleration magnitude of the vehicle during transportation of the package, based on the acquired transportation condition.

According to an embodiment of the present disclosure, technology for transporting packages using a vehicle is improved.

BRIEF DESCRIPTION OF THE DRAWINGS

In the accompanying drawings:

FIG. 5 is a flowchart illustrating operations of the information processing apparatus.

DETAILED DESCRIPTION

Hereinafter, an embodiment of the present disclosure will be described.

Summary of Embodiment

Figure 1:
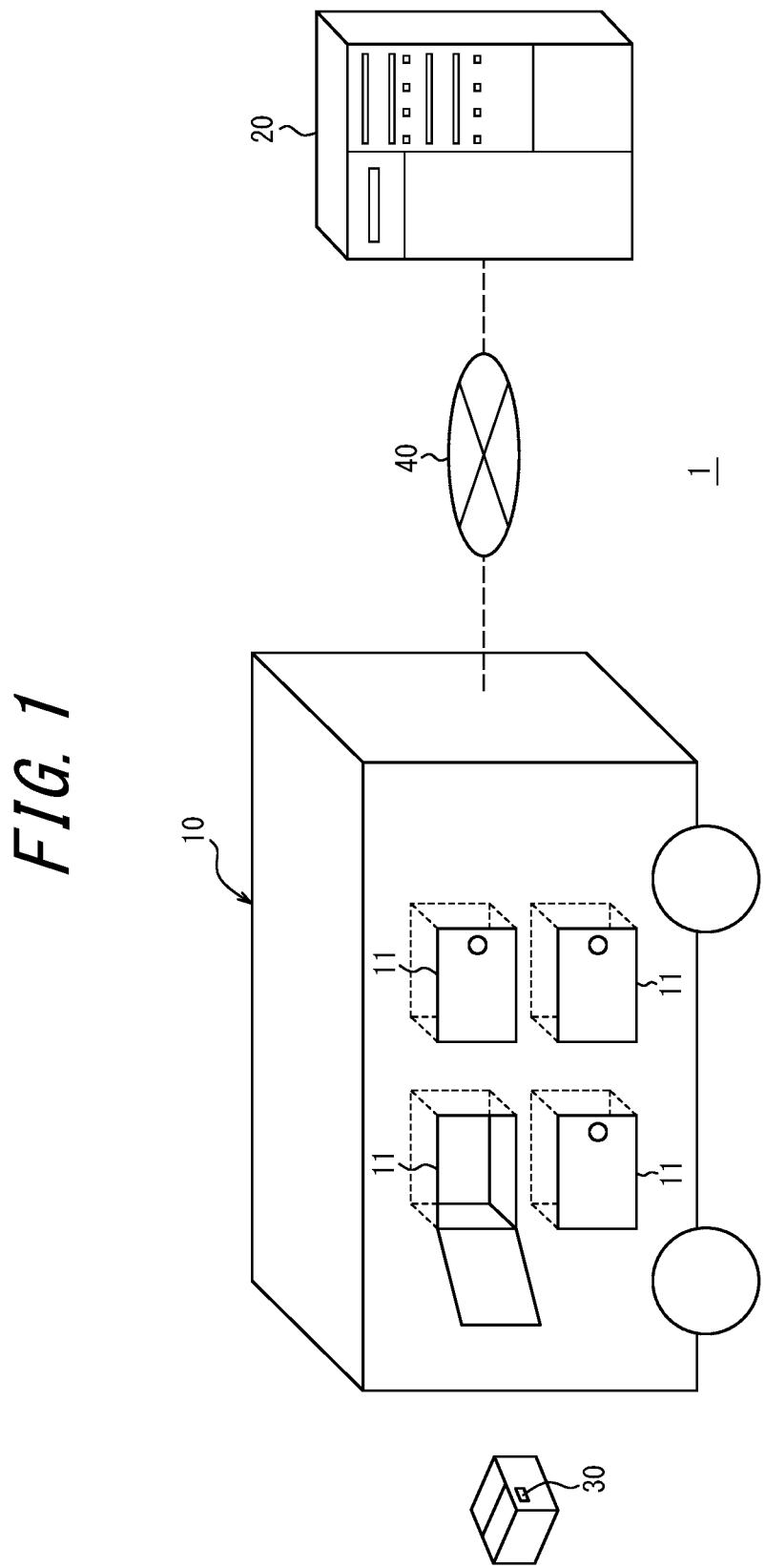
FIG. 1 is a block diagram illustrating a schematic configuration of a system according to an embodiment of the present disclosure.

An outline of a system 1 according to an embodiment of the present disclosure will be described with reference to FIG. 1. The system 1 includes a vehicle 10, an information processing apparatus 20, and a tag 30. The vehicle 10 and the information processing apparatus 20 are communicably connected to a network 40 including, for example, a mobile communication network, the Internet, or the like.

The vehicle 10 is a transportation automobile, for example, but is not limited to this, and may be any appropriate vehicle. The vehicle 10 may be capable of automated driving such as any one of Level 1 to Level 5 as defined by the Society of Automotive Engineers (SAE), for example. The vehicle 10 is provided with storage spaces 11 for storing packages to be transported. Although four storage spaces 11 are illustrated in FIG. 1, the number of storage spaces 11 provided in the vehicle 10 may be determined freely. The vehicle 10 is used for transporting packages stored in the storage spaces 11. The information processing apparatus 20 is, for example, a server apparatus, but is not limited to this and may be any appropriate computer. The tag 30 is a tag that is attached to a package. The tag 30 is, for example, a radio frequency (RF) tag or a tag with a one-dimensional code or a two-dimensional code printed thereon, but these examples are not limiting.

First, an outline of the present embodiment will be described, and details thereof will be described later. When, for example, a package is stored in the storage space 11 by a worker, the vehicle 10 reads information from a tag 30 attached to the package. The vehicle 10 transmits the read information to the information processing apparatus 20 via the network 40. The information processing apparatus 20 acquires a transportation condition for the package based on the information received from the vehicle 10. The information processing apparatus 20 then controls the environment of the storage space 11 during transportation of the package or limits the acceleration magnitude of the vehicle 10 during transportation of the package based on the acquired transportation condition.

According to the present embodiment, the environment of the storage space 11 can be appropriately controlled, or the acceleration magnitude of the vehicle 10 during transportation can be appropriately limited, in this way based on the transportation condition for the package to be stored in the storage space 11. Accordingly, technology for transporting packages using the vehicle 10 is improved in that packages can be transported in an environment appropriate for the packages.

Next, configurations of the system 1 will be described in detail.

(Configuration of Vehicle)

Figure 2:
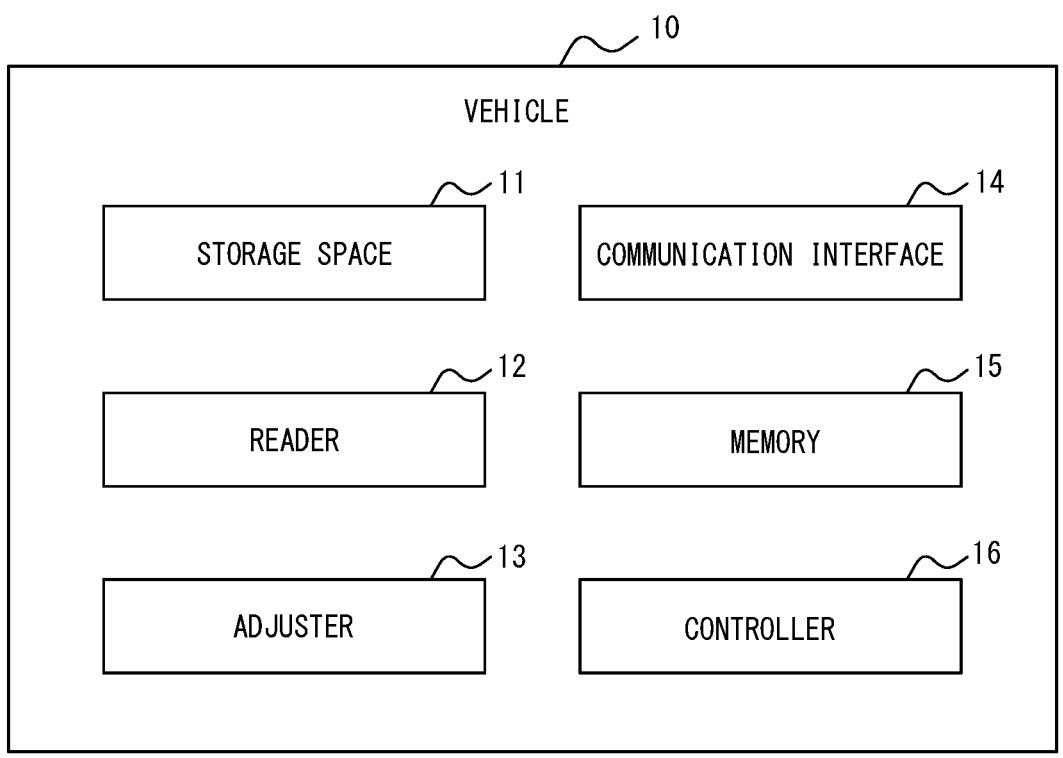
FIG. 2 is a block diagram illustrating a schematic configuration of a vehicle.

As illustrated in FIG. 2, the vehicle 10 includes a storage space 11, a reader 12, an adjuster 13, a communication interface 14, a memory 15, and a controller 16.

The storage space 11 is a space in which a package is stored during transportation. The storage space 11 is provided with a door that can be opened and closed, for example. The storage space 11 may be sealed by closing the door. The door may be opened by a worker who stores a package or a recipient of the package by, for example, entering a password or performing biometric authentication.

The reader 12 includes one or more apparatuses that read information from the tag 30. Non-limiting examples of these apparatuses include radio frequency identification (RFID) readers, code scanners, and cameras. When, for example, the package is stored in the storage space 11, the reader 12 in the present embodiment reads package information, described below, from the tag 30 attached to the package.

The adjuster 13 includes one or more apparatuses that adjust the environment of the storage space 11. Non-limiting examples of such apparatuses include air conditioners, pressurization and depressurization apparatuses, injection apparatuses, and light source apparatuses. An air conditioner is provided in the storage space 11 to enable adjustment of the temperature or humidity of the storage space 11. A pressurization and depressurization apparatus is provided in the storage space 11 to enable adjustment of the air pressure of the storage space 11. An injection apparatus is provided in the storage space 11 to enable injection of a predetermined gas into the storage space 11. A light source apparatus is provided in the storage space 11 to enable irradiation of the storage space 11 with a predetermined light.

The communication interface 14 includes at least one communication interface for connecting to the network 40. The communication interface is compliant with mobile communication standards such as the 4th generation (4G) standard or the 5th generation (5G) standard, for example, but these examples are not limiting. In the present embodiment, the vehicle 10 communicates with the information processing apparatus 20 via the communication interface 14 and the network 40.

The memory 15 includes one or more memories. The memories are semiconductor memories, magnetic memories, optical memories, or the like, for example, but are not limited to these. The memories included in the memory 15 may each function as, for example, a main memory, an auxiliary memory, or a cache memory. The memory 15 stores any information used for operations of the vehicle 10. For example, the memory 15 may store a system program, an application program, embedded software, and the like. The information stored in the memory 15 may be updated with, for example, information acquired from the network 40 via the communication interface 14.

The controller 16 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 16 controls the operations of the entire vehicle 10. For example, the controller 16 can transmit the information read from the tag 30 using the reader 12 to the information processing apparatus 20 via the communication interface 14 and the network 40. For example, the controller 16 can control the environment of the storage space 11 using the adjuster 13 or limit the acceleration magnitude of the vehicle 10 during transportation of the package based on the information received from the information processing apparatus 20 via the communication interface 14 and the network 40.

(Configuration of Information Processing Apparatus)

Figure 3:
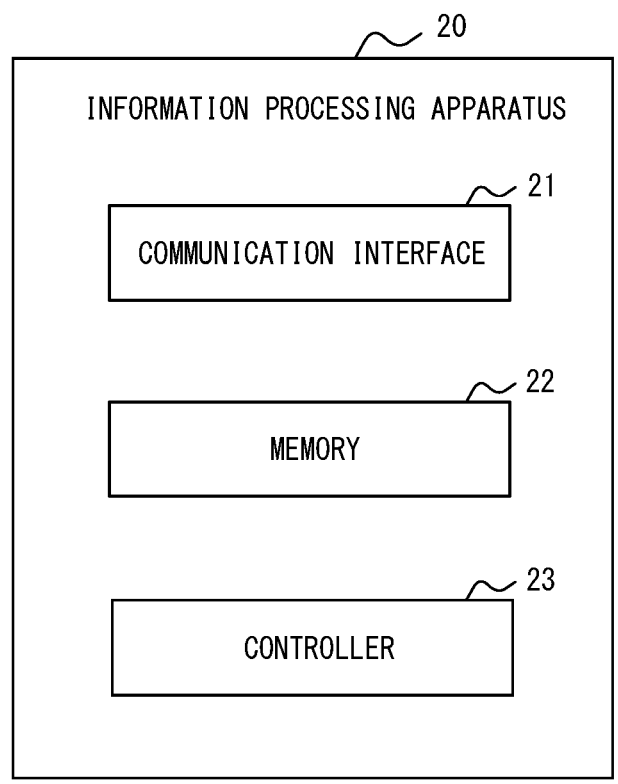
FIG. 3 is a block diagram illustrating a schematic configuration of an information processing apparatus.

As illustrated in FIG. 3, the information processing apparatus 20 includes a communication interface 21, a memory 22, and a controller 23.

The communication interface 21 includes at least one communication interface for connecting to the network 40. The communication interface may be compliant with, for example, mobile communication standards, wired local area network (LAN) standards, or wireless LAN standards, but these examples are not limiting. The communication interface may be compliant with any appropriate communication standards. In the present embodiment, the information processing apparatus 20 communicates with the vehicle 10 via the communication interface 21 and the network 40.

The memory 22 includes one or more memories. The memories included in the memory 22 may each function as, for example, a main memory, an auxiliary memory, or a cache memory. The memory 22 stores any information used in operation of the information processing apparatus 20. For example, the memory 22 may store a system program, an application program, a database, and the like. The information stored in the memory 22 may be updated with, for example, information acquired from the network 40 via the communication interface 21.

Figure 4:
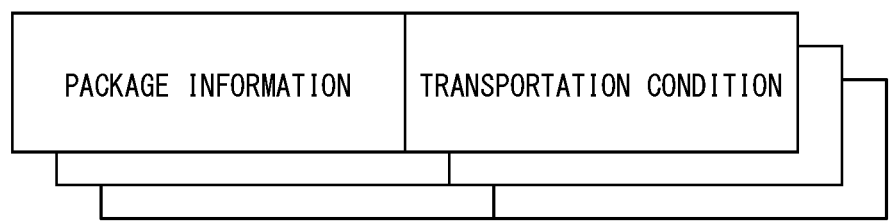
FIG. 4 is a diagram illustrating an example of information stored in the information processing apparatus.

In the present embodiment, the memory 22 stores information indicating the correspondence between the package information and the transportation condition, as illustrated in FIG. 4. In greater detail, the memory 22 stores a plurality of pieces of package information and a plurality of transportation conditions corresponding to the pieces of package information.

The "package information" includes any appropriate information about the package to which the tag 30 is attached. Specifically, the package information may include the name, identification ID, an attribute, or the like of the package. The name may be a product name but is not limited to this example. The identification ID is, for example, information enabling identification of the package in the system 1. The attribute is information that indicates any appropriate property, classification, or the like of the package. For example, the attribute may include "refrigerated", "frozen", "pizza delivery", "fresh food", "glass product", and the like.

The "transportation condition" is any condition that must be satisfied during transportation of the package. In the present embodiment, the transportation condition can include one or more of first through fifth conditions.

The first condition is that the temperature or humidity of the surrounding environment of the package be maintained at a predetermined value or within a predetermined range. For example, if the aforementioned package information is "refrigerated", the transportation condition corresponding to the package information may include a first condition that the temperature be maintained in a range of −5° C. to 5° C. For example, if the aforementioned package information is "frozen", the transportation condition corresponding to the package information may include a first condition that the temperature be maintained at −15° C. or lower. For example, if the aforementioned package information is "pizza delivery", the transportation condition corresponding to the package information may include a first condition that the temperature be maintained between 65° C. and 80° C. For example, if the aforementioned package information is "perishable food", the transportation condition corresponding to the package information may include a first condition that the humidity be maintained between 85% and 100%. However, the correspondence and content of the package information and the first condition are not limited to the above-described examples and may be determined freely.

The second condition is that the air pressure of the surrounding environment of the package be maintained at a predetermined value or within a predetermined range. For example, if the aforementioned package information is "perishable food", the transportation condition corresponding to the package information may include a second condition that the air pressure be maintained between 0.1 Pa and 100 Pa. However, the correspondence and content of the package information and the second condition are not limited to the above-described examples and may be determined freely.

The third condition is that the package be injected with a predetermined gas. For example, if the aforementioned package information is "perishable food", the transportation condition corresponding to the package information may include a third condition that ozone gas be injected. However, the correspondence and content of the package information and the third condition are not limited to the above-described examples and may be determined freely.

The fourth condition is that the package be irradiated with a predetermined light. For example, if the aforementioned package information is "perishable food", the transportation condition corresponding to the package information may include a fourth condition that ultraviolet light be irradiated. However, the correspondence and content of the package information and the fourth condition are not limited to the above-described examples and may be determined freely.

The fifth condition is that the acceleration magnitude of the vehicle 10 be held to a predetermined value or less. For example, if the aforementioned package information is "glass product", the transportation condition corresponding to the package information may include a fifth condition that the acceleration magnitude of the vehicle 10 be 1.96 m/s$^2$ or less. However, the correspondence and content of the package information and the fifth condition are not limited to the above-described examples and may be determined freely.

The controller 23 includes at least one processor, at least one programmable circuit, at least one dedicated circuit, or a combination of these. The controller 23 controls operations of the entire information processing apparatus 20. Details of the operations of the information processing apparatus 20 controlled by the controller 23 will be described later.

(Operation Flow in Information Processing Apparatus)

Operations of the information processing apparatus 20 are described with reference to FIG. 5.

Step S100: The controller 23 of the information processing apparatus 20 stores information indicating the correspondence between the package information and the transportation condition in the memory 22.

Step S101: The controller 23 acquires, for each storage space 11 of the vehicle 10, the transportation condition for the package to be stored in the storage space 11.

Specifically, the controller 23 receives the package information read from the tag 30 by the reader 12 of the vehicle 10 via the communication interface 21 and the network 40. The controller 23 then acquires the transportation condition corresponding to the package information received from the vehicle 10 based on the correspondence between the package information and the transportation condition in step S100. For example, if the package information received from the vehicle 10 is "frozen", a transportation condition including a first condition that the temperature be maintained at −15° C. or lower can be acquired.

A plurality of packages may be stored in one storage space 11. In this case, in step S101, the controller 23 acquires a plurality of transportation conditions respectively corresponding to the plurality of packages. Accordingly, the controller 23 acquires, for each storage space 11, one or more transportation conditions corresponding to one or more packages stored in the storage space 11.

Step S102: The controller 23 judges whether the transportation condition acquired in step S101 can be satisfied. When it is judged that the transportation condition can be satisfied (S102: Yes), the process advances to step S103. Conversely, when it is judged that the transportation condition cannot be satisfied (S102: No), the process advances to step S105.

For example, the case in which two packages are stored in one storage space 11 is now considered. In this case, when the transportation condition for one package includes a first condition that the temperature be maintained in a range of −5° C. to 5° C. and the transportation condition for the other package includes a first condition that the temperature be maintained at −15° C. or lower, for example, the two transportation conditions cannot be satisfied simultaneously. The controller 23 therefore judges that the transportation conditions cannot be satisfied. If the two packages are stored separately in two storage spaces 11, however, the controller 23 can judge that the transportation conditions can be satisfied.

The case in which two packages are stored in one storage space 11 or divided between two storage spaces 11 is now considered. In this case, when the transportation condition for one package includes a fifth condition that the acceleration magnitude of the vehicle 10 be 1.96 m/s$^2$ or less, and the transportation condition for the other package includes a fifth condition that the acceleration magnitude of the vehicle 10 be 0.98 m/s$^2$ or less, the two transportation conditions can be satisfied simultaneously. The controller 23 can therefore judge that the transportation conditions can be satisfied.

The case in which the transportation condition for the package stored in the storage space 11 includes a first condition that the temperature be maintained at −15° C. or lower is now considered. In this case, when the air conditioner included in the adjuster 13 of the vehicle 10 does not have the cooling capacity to maintain the storage space 11 at −15° C. or lower, the transportation condition cannot be satisfied. The controller 23 therefore judges that the transportation conditions cannot be satisfied.

Step S103: When it is judged that the transportation condition can be satisfied in step S102 (step S102: Yes), the controller 23 controls the environment of each storage space 11 during transportation of the package based on the transportation condition acquired in step S101.

Specifically, the controller 23 controls the environment of the storage space 11 by transmitting a control signal for the adjuster 13 of the vehicle 10 to the vehicle 10 via the communication interface 21 and the network 40. For example, the controller 23 maintains the temperature or humidity of the storage space 11 at a predetermined value or lower, using the air conditioner included in the adjuster 13 of the vehicle 10, when the transportation condition for the package stored in the storage space 11 includes the first condition. The controller 23 maintains the air pressure of the storage space 11 at a predetermined value or within a predetermined range, using the pressurization and depressurization apparatus included in the adjuster 13 of the vehicle 10, when the transportation condition for the package stored in the storage space 11 includes the second condition. The controller 23 injects a predetermined gas into the storage space 11, using the injection apparatus included in the adjuster 13 of the vehicle 10, when the transportation condition for the package stored in the storage space 11 includes the third condition. The controller 23 irradiates the storage space 11 with a predetermined light, using the light source apparatus included in the adjuster 13 of the vehicle 10, when the transportation condition for the package stored in the storage space 11 includes the fourth condition.

Step S104: The controller 23 limits the magnitude of the acceleration of the vehicle 10 during transportation of the package based on the transportation condition acquired in step S101.

Specifically, the controller 23 limits the acceleration magnitude of the vehicle 10 during transportation by notifying the vehicle 10 of the upper limit on the acceleration via the communication interface 21 and the network 40. For example, the controller 23 sets the upper limit on the acceleration magnitude of the vehicle 10 to a "predetermined value" indicated in the fifth condition when the transportation condition for the package stored in the storage space 11 includes the fifth condition. Once the upper limit is set, the controller 16 of the vehicle 10 performs acceleration and deceleration operations of the vehicle 10 so that the magnitude of the acceleration generated in the vehicle 10 does not exceed the upper limit, except in predetermined circumstances, such as emergency avoidance.

Step S105: When it is judged that the transportation condition cannot be satisfied in step S102 (step S102: No), the controller 23 provides a warning via the vehicle 10.

Specifically, the controller 23 notifies the vehicle 10 of the content of the warning via the communication interface 21 and the network 40. The vehicle 10 outputs the content of the notified warning via an output apparatus, such as a display apparatus or a speaker provided in the vehicle 10, for example. The content of the warning may, for example, include a message informing a worker that a plurality of packages for which the transportation conditions are not satisfied simultaneously are stored in one or more of the storage spaces 11, or a message prompting the worker to store the plurality of packages for which the transportation conditions are not satisfied simultaneously in different storage spaces 11. These examples are not limiting, however, and the content of the warning may be determined freely.

As described above, the information processing apparatus 20 according to the present embodiment acquires the transportation condition for the package to be stored in the storage space 11. The information processing apparatus 20 then controls the environment of the storage space 11 or limits the acceleration magnitude of the vehicle 10 during transportation of the package based on the acquired transportation condition.

According to this configuration, the environment of the storage space 11 can be appropriately controlled, or the acceleration magnitude of the vehicle 10 during transportation can be appropriately limited, based on the transportation condition for the package to be stored in the storage space 11. Accordingly, technology for transporting packages using the vehicle 10 is improved in that packages can be transported in an environment appropriate for the packages.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the vehicle 10 executes some or all of the operations that are executed by the information processing apparatus 20 in the above embodiment can be implemented. It is also possible to implement an embodiment in which the above-described storage space 11, reader 12, and adjuster 13 are configured as a storage apparatus independent of the vehicle 10. In this case, the storage apparatus can communicate with the vehicle 10 in a wired or wireless manner. The storage apparatus may include a communication interface for communicating with the information processing apparatus 20, or may be capable of communicating with the information processing apparatus 20 via the communication interface 14 of the vehicle 10. Furthermore, an embodiment in which the storage apparatus executes some or all of the operations that are executed by the information processing apparatus 20 in the above embodiment can be implemented.

In the above embodiment, an example in which the reader 12 is provided in the storage space 11 has been described. However, a portable terminal such as a handheld terminal or a smartphone, for example, may be adopted as the reader 12.

In the above embodiment, an example of the vehicle 10 reading the package information from the tag 30 using the reader 12 has been described. However, an embodiment in which the vehicle 10 reads information indicating the transportation condition, instead of reading the package information, from the tag 30 can also be implemented. In this case, the information processing apparatus 20 can receive the information indicating the transportation condition for the package from the vehicle 10. The information processing apparatus 20 therefore need not store information indicating the correspondence between the package information and the transportation condition.

In the above embodiment, an example has been described in which the transportation condition may include the first through fifth conditions. However, the transportation condition may include a sixth condition that a magnitude of vibration be equal to or less than a predetermined value, for example. In this case, the controller 23 of the information processing apparatus 20 may, for example, store information in advance indicating the magnitude of vibration generated in the vehicle 10 during travel on each road included in map data. When the transportation condition for the package to be stored in the storage space 11 includes the sixth condition, the controller 23 may then determine a route for transporting the package by the vehicle 10 prioritizing the use of roads on which the magnitude of the vibration is equal to or less than the predetermined value indicated by the sixth condition and may notify the vehicle 10 of the route.

For example, an embodiment in which a general purpose computer functions as the information processing apparatus 20 according to the above embodiment can also be implemented. Specifically, a program in which processes for realizing the functions of the information processing apparatus 20 according to the embodiment are written is stored in a memory of a computer, and the program is read and executed by a processor of the computer. Accordingly, the present disclosure can also be implemented as a program executable by a processor, or a non-transitory computer readable medium storing the program.

The invention claimed is:

1. A method to be executed by an information processing apparatus configured to communicate with a vehicle that transports two or more packages stored in two independent storage spaces, the method comprising:
storing information indicating a magnitude of vibration generated in the vehicle during travel on each road included in a map data;
acquiring a first transportation condition for the each of the two or more packages to be stored in the corresponding two independent storage spaces such that each of the two independent storage spaces includes at least one of the two or more packages, the first transportation condition including an acceleration condition that an acceleration magnitude of the vehicle be held to a first predetermined value or less during transportation and a vibration condition that a magnitude of vibration be equal to or less than a predetermined value for each of the two or more packages;
determining whether the first transportation condition can be satisfied for each of the two or more packages simultaneously;
determining whether a surrounding environment of each of the two or more packages within each of the two independent storage spaces can be maintained at a second predetermined value or within a second predetermined range as a second transportation condition;
determining a route for transporting the two or more packages by the vehicle including roads on which the magnitude of vibration is equal to or less than the second predetermined value; in response to the determination that the first transportation condition and the second transportation condition can be satisfied, transmitting a signal notifying the vehicle of an upper limit of acceleration magnitude of the vehicle to maintain the acceleration magnitude generated in the vehicle during transportation of the two or more packages within the upper limit of acceleration magnitude of the vehicle and notifying the vehicle of the determined route;
in response to the determination that the first transportation condition and the second transportation condition for any of the two or more packages to be stored in the corresponding two independent storage spaces cannot be simultaneously satisfied, transmitting a warning notification that at least one of the two or more packages for which the first transportation condition or the second transportation condition is not satisfied are stored in the two independent storage spaces; and
setting, when the first transportation condition includes the acceleration condition that the acceleration magnitude of the vehicle be held to the first predetermined value or less during transportation, the upper limit of the acceleration magnitude of the vehicle to the first predetermined value and limiting the acceleration magnitude of the vehicle during travel on the determined route based on the upper limit of acceleration magnitude of the vehicle.

2. The method of claim 1, further comprising:
controlling an environment of the two independent storage spaces during transportation of the two or more packages based on the acquired second transportation condition, wherein
the second transportation condition for the two or more packages includes a first condition that a temperature or humidity of the surrounding environment of the two or more packages be maintained at the second predetermined value or within the second predetermined range, and
the information processing apparatus is configured to use an air conditioner provided for the two independent storage spaces to maintain the temperature or humidity of the corresponding two independent storage spaces at the second predetermined value or within the second predetermined range.

3. The method of claim 1, further comprising:
controlling an environment of the two independent storage spaces during transportation of the two or more packages based on the acquired second transportation condition, wherein
the second transportation condition for the two or more packages includes a second condition that an air pressure of the surrounding environment of the two or more packages be maintained at the second predetermined value or within the second predetermined range, and
the information processing apparatus is configured to use a pressurization and depressurization apparatus provided for the two independent storage spaces to maintain the air pressure of the two independent storage spaces at the second predetermined value or within the second predetermined range.

4. The method of claim 1, further comprising:
controlling an environment of the two independent storage spaces during transportation of the two or more packages based on the acquired second transportation condition, wherein
the second transportation condition for the two or more packages includes a third condition that a predetermined gas be injected into the two or more packages, and
the information processing apparatus is configured to inject the predetermined gas into the two independent storage spaces using an injection apparatus provided for the two independent storage spaces.

5. The method of claim 1, further comprising:
controlling an environment of the two independent storage spaces during transportation of the two or more packages based on the acquired second transportation condition, wherein
the second transportation condition for the two or more packages includes a fourth condition that the two or more packages be irradiated with a predetermined light, and
the information processing apparatus is configured to irradiate the two independent storage spaces with the predetermined light using a light source apparatus provided for the two independent storage spaces.

6. The method of claim 1, further comprising providing the warning notification via the vehicle when the first transportation condition or the second transportation condition for the two or more packages stored in the two independent storage spaces cannot be satisfied.

7. An information processing apparatus configured to communicate with a vehicle that transports two or more packages stored in two independent storage spaces comprises a controller configured to:
- store information indicating a magnitude of vibration generated in the vehicle during travel on each road included in a map data;
- acquire a first transportation condition for each of the two or more packages to be stored in the corresponding two independent storage spaces such that each of the two independent storage spaces includes at least one of the two or more packages, the first transportation condition including an acceleration condition that an acceleration magnitude of the vehicle be held to a first predetermined value or less during transportation and a vibration condition that a magnitude of vibration be equal to or less than a predetermined value for each of the two or more packages;
- determine whether the first transportation condition can be satisfied for each of the two or more packages simultaneously;
- determine whether a surrounding environment of each of the two or more packages within each of the two independent storage spaces can be maintained at a second predetermined value or within a second predetermined range as a second transportation condition;
- determine a route for transporting the two or more packages by the vehicle including roads on which the magnitude of vibration is equal to or less than the second predetermined value;
- in response to the determination that the first transportation condition and the second transportation condition can be satisfied, transmit a signal notifying the vehicle of an upper limit of acceleration magnitude of the vehicle to maintain the acceleration magnitude generated in the vehicle during transportation of the two or more packages within the upper limit of acceleration magnitude of the vehicle and notifying the vehicle of the determined route;
- in response to the determination that the first transportation condition and the second transportation condition for any of the two or more packages to be stored in the corresponding two independent storage spaces cannot be simultaneously satisfied, transmit a warning notification that at least one of the two or more packages for which the first transportation condition or the second transportation condition is not satisfied are stored in the two independent storage spaces; and
- set, when the first transportation condition includes the acceleration condition that the acceleration magnitude of the vehicle be held to the first predetermined value or less during transportation, the upper limit of the acceleration magnitude of the vehicle to the first predetermined value and limit the acceleration magnitude of the vehicle during travel on the determined route based on the upper limit of acceleration magnitude of the vehicle.

8. The information processing apparatus of claim 7, wherein
- the second transportation condition for the two or more packages includes a first condition that a temperature or humidity of the surrounding environment of the two or more packages be maintained at the second predetermined value or within the second predetermined range, and
- the controller is configured to use an air conditioner provided for the two independent storage spaces to maintain the temperature or humidity of the corresponding two independent storage spaces at the second predetermined value or within the second predetermined range.

9. The information processing apparatus of claim 7, wherein
- the second transportation condition for the two or more packages includes a second condition that an air pressure of the surrounding environment of the two or more packages be maintained at the second predetermined value or within the second predetermined range, and
- the controller is configured to use a pressurization and depressurization apparatus provided for the two independent storage spaces to maintain the air pressure of the two independent storage spaces at the second predetermined value or within the second predetermined range.

10. The information processing apparatus of claim 7, wherein
- the second transportation condition for the two or more packages includes a third condition that a predetermined gas be injected into the two or more packages, and
- the controller is configured to inject the predetermined gas into the two independent storage spaces using an injection apparatus provided for the two independent storage spaces.

11. The information processing apparatus of claim 7, wherein
- the second transportation condition for the two or more packages includes a fourth condition that the two or more packages be irradiated with a predetermined light, and
- the controller is configured to irradiate the two independent storage spaces with the predetermined light using a light source apparatus provided for the two independent storage spaces.

12. The information processing apparatus of claim 7, wherein the controller is configured to provide the warning notification via the vehicle when the first transportation condition or the second transportation condition for the two or more packages stored in the two independent storage spaces cannot be satisfied.

13. A vehicle comprising two independent storage spaces and a controller configured to:
- store information indicating a magnitude of vibration generated in the vehicle during travel on each road included in a map data;
- acquire a first transportation condition for two or more packages to be stored in the corresponding two independent storage spaces such that each of the two independent storage spaces includes at least one of the two or more packages, the first transportation condition including an acceleration condition that an acceleration magnitude of the vehicle be held to a first predetermined value or less during transportation and a vibration condition that a magnitude of vibration be equal to or less than a predetermined value for each of the two or more packages;
- determine whether the first transportation condition can be satisfied for each of the two or more packages simultaneously;
- determine whether a surrounding environment of each of the two or more packages within each of the two independent storage spaces can be maintained at a second predetermined value or within a second predetermined range as a second transportation condition;

determine a route for transporting the two or more packages by the vehicle including roads on which the magnitude of vibration is equal to or less than the second predetermined value;

in response to the determination that the first transportation condition and the second transportation condition can be satisfied, transmit a signal notifying the vehicle of an upper limit of acceleration magnitude of the vehicle to maintain the acceleration magnitude generated in the vehicle during transportation of the two or more packages within the upper limit of acceleration magnitude of the vehicle and notifying the vehicle of the determined route;

in response to the determination that the first transportation condition and the second transportation condition for any of the two or more packages to be stored in the corresponding two independent storage spaces cannot be simultaneously satisfied, transmit a warning notification that at least one of the two or more packages for which the first transportation condition or the second transportation condition is not satisfied are stored in the two independent storage spaces; and set, when the first transportation condition includes the acceleration condition that the acceleration magnitude of the vehicle be held to the first predetermined value or less during transportation, the upper limit of the acceleration magnitude of the vehicle to the first predetermined value and limit the acceleration magnitude of the vehicle during travel on the determined route based on the upper limit of acceleration magnitude of the vehicle.

14. The vehicle of claim 13, wherein the second transportation condition for the two or more packages includes a first condition that a temperature or humidity of the surrounding environment of the two or more packages be maintained at the second predetermined value or within the second predetermined range, and the controller is configured to use an air conditioner provided for the two independent storage spaces to maintain the temperature or humidity of the corresponding two independent storage spaces at the second predetermined value or within the second predetermined range.

15. The vehicle of claim 13, wherein the second transportation condition for the two or more packages includes a second condition that an air pressure of the surrounding environment of the two or more packages be maintained at the second predetermined value or within the second predetermined range, and the controller is configured to use a pressurization and depressurization apparatus provided for the two independent storage spaces to maintain the air pressure of the two independent storage spaces at the second predetermined value or within the second predetermined range.

16. The vehicle of claim 13, wherein the second transportation condition for the two or more packages includes a third condition that a predetermined gas be injected into the two or more packages, and the controller is configured to inject the predetermined gas into the two independent storage spaces using an injection apparatus provided for the two independent storage spaces.

17. The vehicle of claim 13, wherein the second transportation condition for the two or more packages includes a fourth condition that the two or more packages be irradiated with a predetermined light, and the controller is configured to irradiate the two independent storage spaces with the predetermined light using a light source apparatus provided for the two independent storage spaces.

* * * * *